United States Patent [19]
Boardman

[11] 3,771,128
[45] Nov. 6, 1973

[54] METHOD AND APPARATUS FOR CREDIT VERIFICATION

[75] Inventor: John D. Boardman, Chelmsford, Mass.

[73] Assignee: Keymatch Computer Corporation, Woburn, Mass.

[22] Filed: Nov. 8, 1971

[21] Appl. No.: 196,309

[52] U.S. Cl............ 340/146.2, 235/177, 340/149 A
[51] Int. Cl. .............................................. G06f 7/20
[58] Field of Search ................... 340/149 A, 146.2; 235/177, 61.7 B

[56] References Cited
UNITED STATES PATENTS

| | | | |
|---|---|---|---|
| 3,401,830 | 9/1968 | Mathews | 221/2 |
| 3,691,350 | 9/1972 | Kuhns et al. | 235/61.7 B |
| 3,221,304 | 11/1965 | Enikeieff et al. | 235/61.7 B |
| 3,612,687 | 10/1971 | Cook et al. | 235/61.7 B |
| 3,573,731 | 4/1971 | Schwend | 235/61.7 B |
| 3,643,216 | 2/1972 | Greenaway et al. | 235/61.7 B |
| 3,588,449 | 6/1971 | Paterson | 235/61.7 B |

Primary Examiner—Malcolm A. Morrison
Assistant Examiner—James F. Gottman
Attorney—C. Yardley Chittick et al.

[57] ABSTRACT

A credit verification operation is achieved by entering an account number which undergoes transformation into encoded form and entering a verification number supplied by the customer which also is subjected to a transformation into encoded form with the two encoding operations being such that a comparison can be made between the format and information content of the two encoded numbers. The verifying number preferably has a lower number of digits than the account number and the transformation involved nevertheless lets a comparison be made between the account number and the verifying number even though in their original form they have an unequal number of digits. Either the encoding transform or the comparison combinations of the encoded form of the numbers may be changed and scrambled to alter the validity of the verifying number without requiring the reissuance of the account number. When a correct comparison occurs the indication that credit is verified is made and conversely the absence of comparison indicates that the transaction is not authorized.

9 Claims, 5 Drawing Figures

PATENTED NOV 6 1973

METHOD AND APPARATUS FOR CREDIT VERIFICATION

BACKGROUND OF THE INVENTION

MAny credit and security checking systems are known in the prior art which involve the comparison of a machine read credit card number and the verification thereof by the person who has presented the card by means of a manual manipulation which enters a verifying member. It is also well known in the prior art to provide scrambling or other cryptographic transforms between the numbers in the usual decimal notation and that notation where a comparison occurs in order to require a new verification number from time to time thereby eliminating the security threat involved when the existing code or a certain percentage of the outstanding account numbers have been compromised by unauthorized persons gaining adequate information to thwart the security level of protection intended for the system. Prior art systems of this type generally suffer from limitations imposed by the length of the account number or the requirement for a physically encoded card such as perforations or magnetic code portions which can be machine read.

Where the standard account number is used there are generally a large number of digits and/or letters in the account number and these are generally readily visible on the credit card or in the case of bank checks can be readily learned from observing the number on a check or other such negotiable instrument. Thus verification by having the person who presents the instrument for a financial transaction repeat the long account number is impractical since all the legitimate transactions conducted in a business day would require the repetition from memory on an unmanageably long number and such information could readily be obtained by an unauthroized person and utilized to defeat the security of the system. The alternative which requires an encoded card having a fixed pattern or other physical characteristic such as perforations, embossed Hollerith code or magnetic inserts and the like requires for its universal application the adoption of a standardized encoding format for the credit card and in the case of cashing bank checks would require either an auxiliary credit card or some universal modification of the bank check in order to be in the form which could enter the physical code pattern on the instrument or credit card for comparison with the verifying number supplied by the person desiring to make the financial transaction.

The other form of credit verification system which is becoming increasingly more important due to widespread use is the use of a communication link between the retail point of sale and a centralized computer which contains up-dated account information and can respond to an inquiry with respect to a given account number to authorize or withhold credit or approval of a given transaction depending on any preselected criteria. Such systems generally lack a fool-proof way of identifying the person who presents the credit card or financial instrument since in the case of a lost or stolen card an unauthorized person presenting the card generally need not be identified or, if identification is required, the means for identification is relatively insecure such as the use of photographs, fingerprints or a signature which must be compared to the person's actual appearance or the appearance of a recorded version thereof in the case of fingerprints or signatures.

BRIEF SUMMARY OF THE INVENTION

The present invention is applicable to all forms of verification transaction systems, the simplest of which merely involves a verification operation at the point of sale with no connection to remote equipment or reference to external or stored data in any form. While this simple and straight-forward arrangement forms the basis for the detailed disclosure of the invention presented herein it will be appreciated that the essential features so disclosed are as readily incorporated in a complex nation-wide retailing operation where additional functions may be desired in addition to the basic verification operation performed by the present invention. In general, the present invention will provide a means for entering an account number which can be either a manual or machine-readable input with the further provision for entering a verifying number which is known only to an authorized person and which will be a different number for the individuals in a group of authorized persons so that one member of the group cannot use the number known to him to perform a transaction with respect to the account of another member of the group. These data entry operations may be performed in any manner such as using machine-readable format such as credit cards, bank checks with magnetic numerals thereon for the account number, etc., but in the simplest form this data entry can be achieved with a simple ten-digit keyboard or combined alphanumeric keyboard if letters as well as numbers are used in the account and verification numbers. In this regard, it should be understood that although the present description uses numeric digits only, the invention is not to be considered as limited to numbers, but as is obvious, can as readily be applied using alphanumeric sequences and the description and claims should be so interpreted.

The account and verifying numbers so entered are subject to a transformation which may be of the most generalized form to render the two numbers in encoded form of the same kind such that the format of the two numbers can be matched and the information content thereof compared. By causing the transormation of the verifying number in the encoded form thereof to assume a format which matches to a substantial extent the format of the much longer account number, the possibility for verifying a long account number with a relatively short memorized number such as a three-digit number, for example, exists and with the versatility of coding schemes that are available the probability that an unauthorized transaction could take place due to duplication of code correspondence for two account numbers with the same verifying number is almost zero. The security of the system can be periodically renewed by issuing new account numbers to authorized users and altering the encoding arrangement and a similar result can be achieved by scrambling the digit comparison connections for the encoded numbers thereby providing two independent code correspondence algorithms which nevertheless may be used in combination to make the exact algorithm indiscernable to an unauthroized person who has somehow gained access to the system for close scrutiny and detailed examination.

In the preferred embodiment herein described which utilizes the broad principles of the present invention, a simple device will be disclosed which permits the sequential entry on an ordinary keyboard of an account number and the verifying number with these numbers stored in their encoded form in appropriate registers which registers are capable of a digit-by-digit comparison operation to indicate an authorized transaction if the correct verifying number is entered to correspond to the account number. A device of this type is ideally suited for use by a bank teller, for example, since no connection with external data or reference thereto is required and except for supplying a device with electric power it is completely independent of any other instrumentality. When a check is presented to be cashed, the teller merly enters the account number of the check and asks the person presenting the check for his verifying number which is usually a three-digit number and the teller then enters this number on the same keyboard. As soon as the verifying number is entered, the device indicates correspondence or not and if the correct verifying number has been entered, the transaction is approved. The customer who wishes to cash the checks can be supplied with his monthly statement or at any other time with a new verifying number and the machine is readily changed to accommodate the new verifying numbers for all accounts thereby increasing the security of the system and thwarting unauthorized use which may occur after a compromise of the system has occurred due to unauthorized release of verifying number information.

DESCRIPTION OF THE PREFERRED EMBODIMENT

Figure 1:
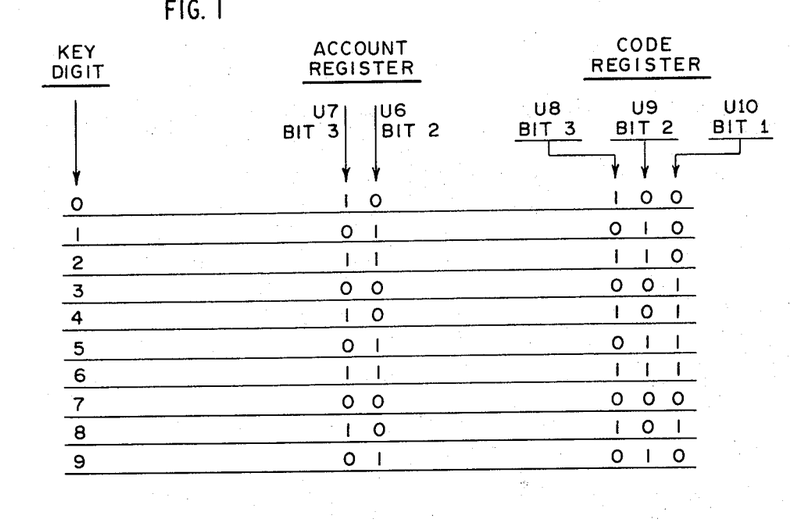
FIG. 1 is a numerical table showing a simple relation between the ordinary numerals in base 10 and the binary numbers to which they are transformed for both the account and verifying number registers.

Referring to FIG. 1, the decimal digits zero through nine are shown in the column designated Key Digit and in the columns designated Account Register and Code Register the binary numbers into which the respective decimal numbers are transformed in a particular encoding scheme are shown. As indicated in the Account Register column, the decimal digits are transformed into two-digit binary numbers, the least significant digit being designated bit 2 which, as hereinafter described, will be stored in register U6 and the most significant digit is designated bit 3 which is stored in a register U7. In the Code Register column, the decimal digits are shown converted into a three-digit binary number comprising bit 1, bit 2, and bit 3 which are stored in registers U10, U9 and U8, respectively. At this point it should be emphasized that the binary coding shown in columns Account Register and Code Register are or can be entirely arbitrary and may take a wide variety of forms. The only restriction on the encoding operation required in accordance with the present invention is that the format contain the same elements and the same decimal digit transforms into a different number of digits in the two encoded forms. Thus as shown in FIG. 1, the encoded forms are both in the binary system utilizing only the digits zero and one and the Account Register uses a two-digit binary number whereas the Code Register uses a three-digit binary number. Where the Code Register version of an input decimal digit has a higher number of binary digits than in the Account Register, the conditions for having the verifying number required for obtaining correspondence with a given account number be shorter than the account number itself exists and where a multiple-digit account number is used a substantially shorter verifying number is required.

Figure 2:
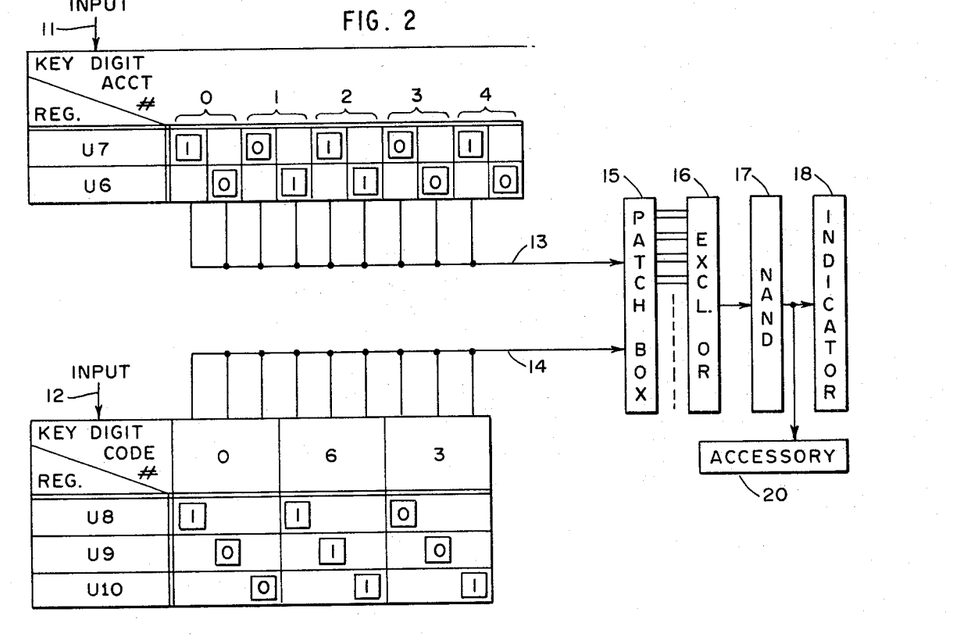
FIG. 2 is a block diagram of a system for performing the invention utilizing the numeral encoding shown in FIG. 1.

In FIG. 2 a simple system in accordance with the invention is shown using the encoding disclosed in FIG. 1. In FIG. 2 a data entry input 11 for the account number is shown and this account number may be presented in parallel or serially in sequence to accomplish data entry of the account number which in FIG. 2 is indicated to be 01234. Under the transform encoding shown in FIG. 1, the account number entered at input 11 appears in registers U6 and U7 as the binary sequence 1001110010.

Similarly the verifying number is applied to an input 12 and the decimal digits so entered are stored in the binary registers U8, U9 and U10 in accordance with the encoding shown in the Code Register column of FIG. 1. Thus the verifying decimal number entered in FIG. 2 is shown as 063 and the corresponding sequence of binary digits in registers U8, U9 and U10 is 100111001.

Each of the binary digits in the registers U6 and U7 is brought out separately on line 13 and the individual binary digits of registers U8, U9 and U10 are brought individually on line 14. Lines 13 and 14 are connected through a patchbox 15 where line pairs selected one digit each from lines 13 and 14 are arranged in predetermined selected pairing with the paired lines applied to a plurality of exclusive OR circuits in unit 16. Each exclusive OR in unit 16 requires the same binary digit from lines 13 and 14 at its input to produce an output signal which will enable NAND 17. Thus each exclusive OR 16 must find correspondence between its respective binary digits derived from lines 13 and 14 to enable its corresponding NAND circuit in unit 17 and, accordingly, the NAND 17 will produce an output signal only if this correspondence exists for all of the inputs to the exclusive OR's in unit 16 and hence only if all of the binary digits in the sequence stored in registers U6 and U7 correspond to the sequence of binary digits stored in registers U8, U9 and U10. In this simplified version shown in FIG. 2, obviously the connection through the patchbox 15 is direct i. e., the first or left-hand stage of register U7 is compared with the first or left-hand stage of U8 without any scrambling through the patchbox connections 15. If such scrambling were desired for improved security the verifying number 063 would, of course, no longer be valid and a new verifying number would be required to obtain correspondence with the account number, the exact digit sequence for the verifying number being dependent upon the cross connections selected for pairing the individual counter-stage lines from inputs 13 and 14 to the paired outputs to exclusive ORS in unit 16. When the correct verifying number is supplied and correspondence obtained the output of NAND 17 operates an indicator 18 to inform the operator that the credit verification is positive.

Figure 3A:
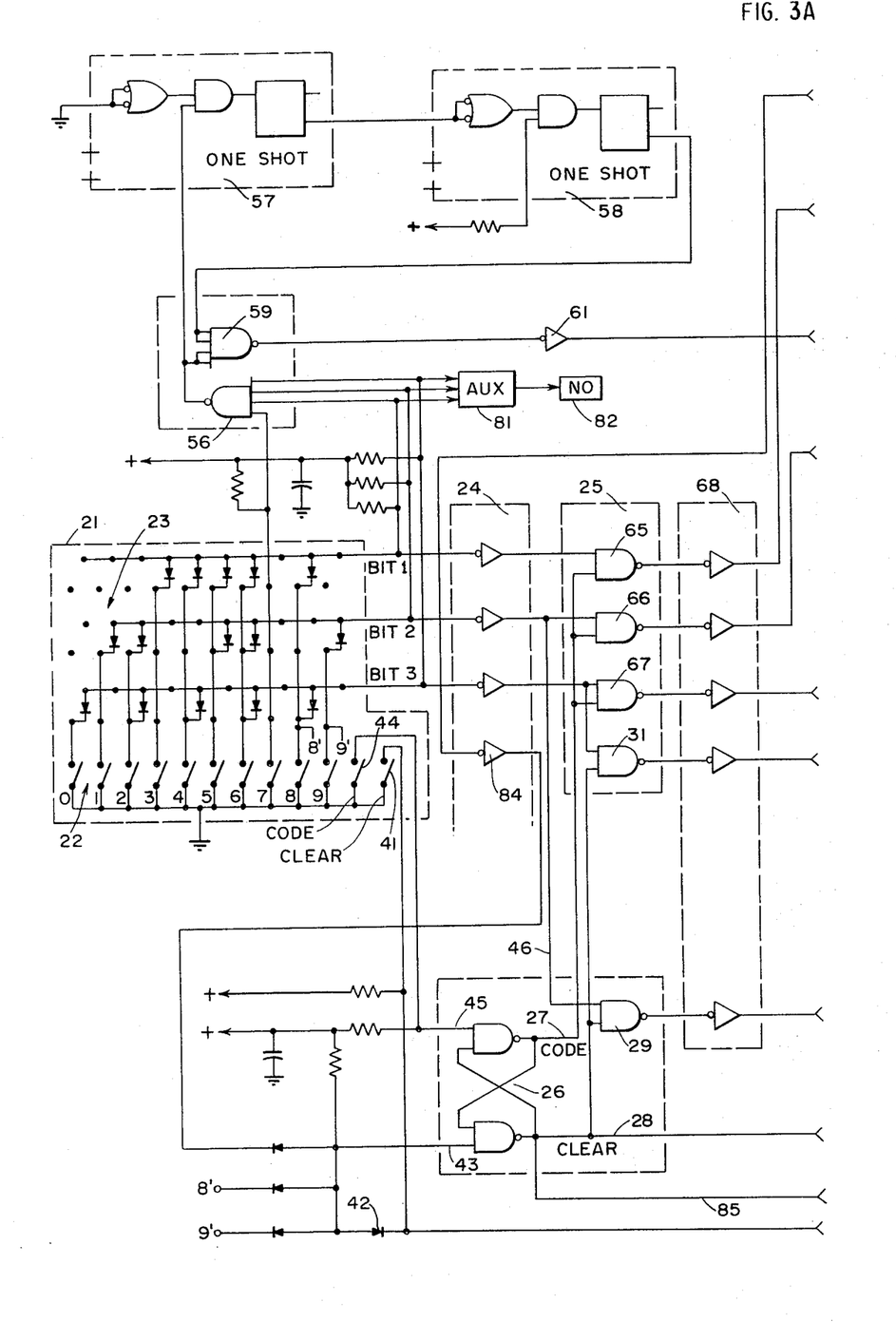
FIGS. 3A, B, and C assembled as indicated show a schematic logic diagram of a particular embodiment of the invention.
Figure 3B:
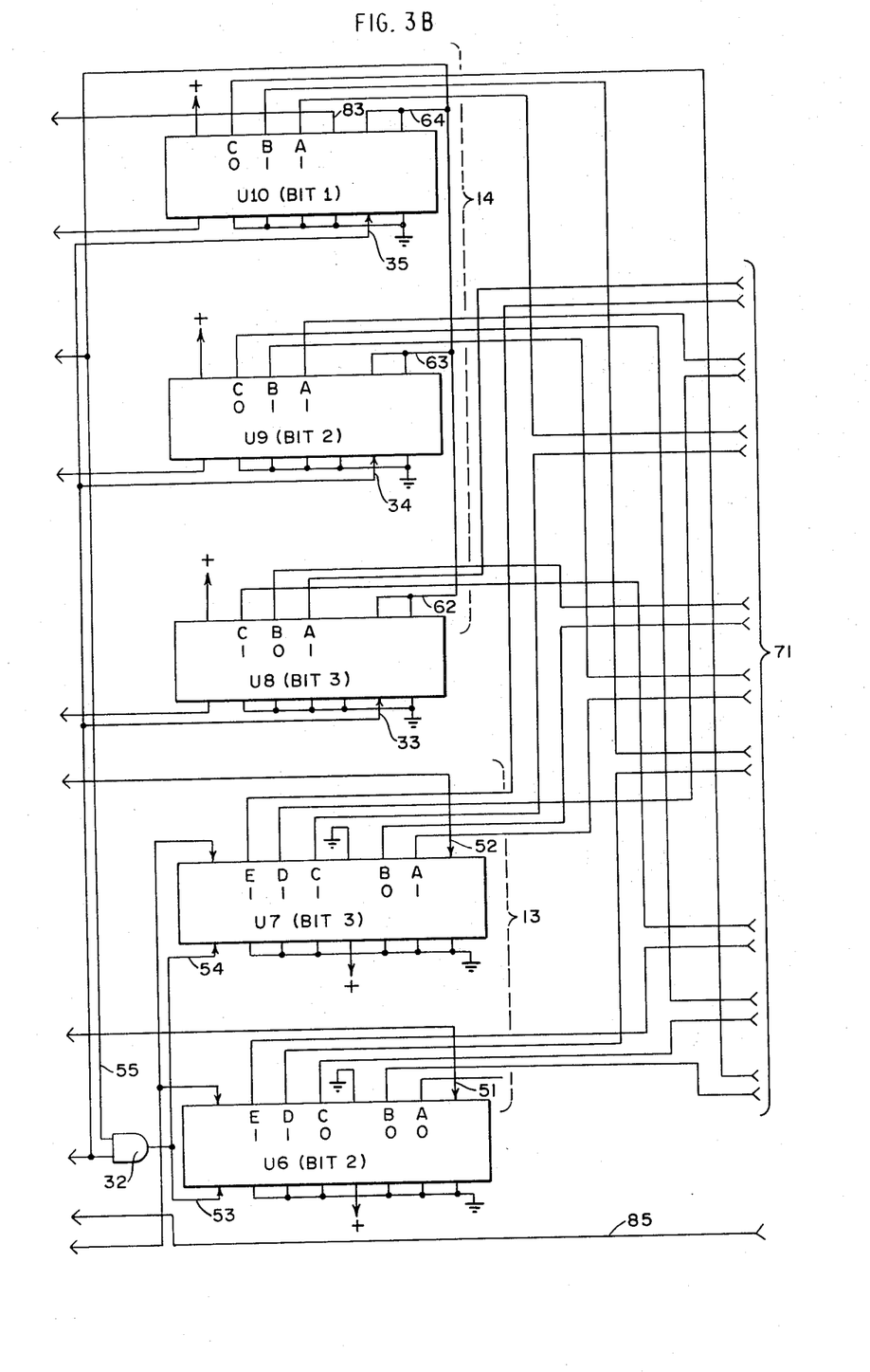
Figure 3C:
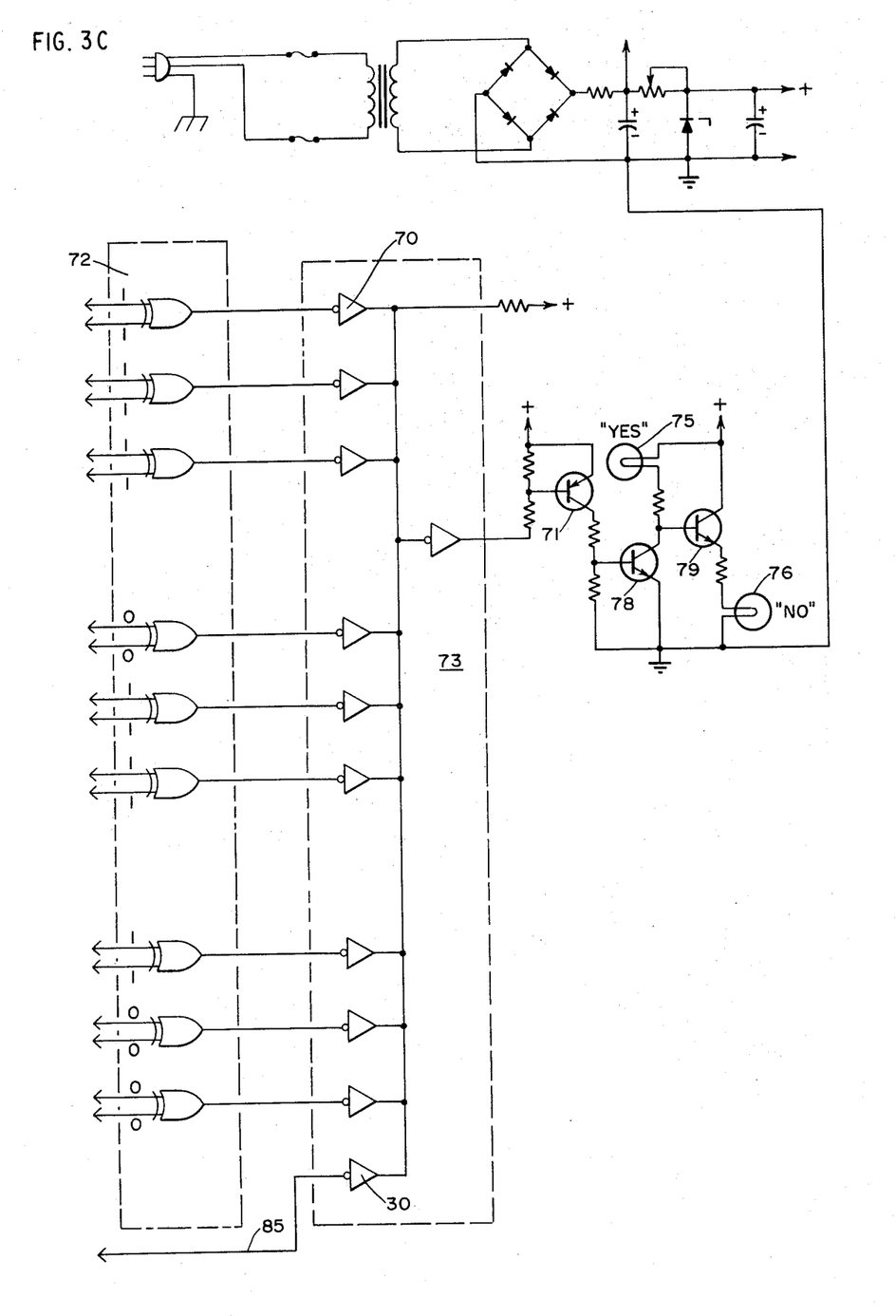

Referring now to FIGS. 3A, 3B, and 3C, assembled as indicated, a particular embodiment of the present invention will now be described. In this embodiment separate registers for the account number and the verifying number are provided thereby permitting the numbers to be entered sequentially on a simple keyboard entry device. Upon completion of the data entry a simple yes or no indication of credit verification is obtained. The keyboard encoder 21 has twelve manually actuated switches generally indicated at 22 for the numerals zero through nine and the functions CODE and CLEAR. Each of the decimal digits 0–9 is connected to encode through a diode matrix generally indicated at 23 the binary encoded digit on lines bit 1, bit 2, and bit 3, corresponding to the depressed decimal key 0–9. The bit lines are connected through inverters 24 to respective NAND gates 25, the second input of which is derived from a flip-flop 26 on CODE line 27. The other output of flip-flop 26 is CLEAR line 28. CLEAR line 28 is connected as an input to NAND 29, NAND 31, clock control gate 32, the CLEAR inputs 33, 34, 35 of the three-digit Code Resigers U8, U9 and U10 and inverter 30.

Referring again to flip-flop 26, a circuit from CLEAR key 41 through diode 42 to set input 43 sets the flip-flop 26 to produce a CLEAR output on CLEAR line 28 when CLEAR switch 41 is depressed. A circuit from code key 44 to reset input 45 resets the flip-flop 26.

With the flip-flop 26 set, CLEAR line 28 enables NANDS 29 and 31 as well as clock control gate 32. Hence an account number entered by depressing one of the key switches 22 transfers the binary encoded signal as determined by the matrix 23 for bit 2 via line 46 through NAND 29 to condition input 51 of account register U6 such that the ensuing clock pulse on clock input 53 enters a ZERO or ONE in the first stage of U6. Similar information for bit 3 is transferred through NAND 31 to condition input 52 of account register U7 which thus enters a ZERO or ONE in the first stage of U7. As each successive account number is entered on keyboard 22, the two-bit binary word is clocked into registers U6 and U7 as above described and transferred stage-by-stage to the right so that after five successive decimal digits have been entered by sequential depression of the keys 22, the encoded bit 2 and bit 3 binary representations appear in U6 and U7 with the most significant binary digit appearing at output stage terminal line A in each register and the last entered least significant digit appearing at output line E of each register.

To enter the data in registers U6 and U7 the bit 2 and bit 3 digits are applied as previously described at input terminals 51 and 52 respectively and a clock signal clocks the register to enter and advance the data contained therein at terminals 53 and 54 respectively. This clock signal is derived from the clock control gate 32 which is enabled by the CLEAR line 28 of flip-flop 26 and receives a clock pulse on line 55. The clock pulse on line 55 is derived as follows: Any time a key 22 is depressed NAND 56 produces an output that fires one shot 57, the delayed output of which fires one shot 58 which has an output applied to NAND 59, the other input of which is derived from NAND 56. Thus the output of NAND 59 is a delayed pulse occurring at predetermined time after the depression of any key which has enabled NAND 56, the delay being such that the clock pulse output of NAND 59 will occur before the manual depression of one of the keys 22 has terminated the enabling output from NAND 56. The output from NAND 59 is inverted in inverter 61 to supply the clock pulse on line 55 which in addition to the previously described circuit is also connected to clock verifying code registers U8, U9 and U10 on lines 62, 63 and 64, respectively.

With a five-digit account number encoded in registers U6 and U7 the next operation will be to enter the verifying number and for this purpose code keyswitch 44 is depressed resetting flip-flop 26 thereby enabling NANDS 65, 66 and 67 and disenabling the logic connected to CLEAR line 28. With these NANDS enabled the encoded bit 1, bit 2 and bit 3 information corresponding to the depressed keys of the verifying number are transferred through inverters 24, the NANDS 25 and inverters 68 to enter bit 1, bit 2 and bit 3 in registers U10, U9 and U8 respectively. The three binary digits for a given decimal digit entered by depressing one of the keys 22 are thus stored in corresponding stages of the registers U8, U9 and U10 and after three successive verifying decimal digits have been entered by keyboard 22 the first entered most significant digit of the verifying number appears at terminals A of registers U8, U9 and U10, the second entered number appears at terminals B, and the last entered number appears at terminals C of these registers, the clock pulse input serving to step the previously entered three-digit binary number from stage to stage to the right in the registers as subsequent numbers are entered.

The connections from the outputs of the registers U6–U10 inclusive to the portion of the circuit shown in FIG. 3C corresponds generally to the patchbox 15 described in connection with FIG. 2. For this purpose all of the terminals A, B, C, D and E of the registers U6 and U7 are connected as individual lines 13, corresponding to line 13 of FIG. 2, in a predetermined fashion with the output terminals A, B, C of registers U8, U9 and U10 connected individually corresponding to line 14 as described in FIG. 2. This correspondence with lines 13 and 14 is indicated in FIG. 3B and the exact selection of paired lines from the groups 13 and 14 is for the particular embodiment shown as illustrated. Although not illustrated as readily interchangeable plug box type connections it is clear that the line groups 13 and 14 are connected in pairs to the terminal group 71 in FIG. 3B and could, of course, be connected in different pairings. This scrambling or selection of the paired lines represents another point at which the relation between the account number and the verifying code number could be changed, the other determining factor being, as previously described, the coding in the diode matrix 23.

The paired outputs 71 of FIG. 3B are connected as paired inputs to a set of exclusive ORS 72 shown in FIG. 3C which circuits produce an output only when the paired inputs to each individual exclusive OR are the same. Since there are nine binary digits in the registers U8, U9 and U10 and 10 digits in the registers U6 and U7 there is one excess digit and this is the unused output A of register U6. Thus the paired inputs represented at 71 require that the binary digit in the account registers U6 and U7 and the binary digit from the verifying Code Registers U8, U9 and U10 selected for any given pair be the same binary digit in order to enable and produce an output from the corresponding exclusive OR circuit 72 to which each code pair is connected. The outputs of the exclusive ORS 72 are all connected through inverters 70 of a NAND circuit 73 such that an output is produced from NAND 73 only if all the exclusive ORS 72 are producing an output.

The output circuit comprises a YES lamp 75 and a NO lamp 76. These lamps are controlled by PNP transistor 71 and NPN transistors 78 and 79. The base of transistor 71 is connected to the output of NAND 73 which in the absence of an output signal is high keeping transistor 71 non-conducting and thus maintaining the base of transistor 78 low. Transistor 78 is thus non-conducting and the YES light 75 is off. The base of transistor 79 is therefore high and the NO light 76 is normally on. If there is an output from NAND 73 the base of transistor 71 goes low raising the base of transistor 78 to cause it to conduct thereby illuminating the YES light 75 and by virtue of saturation in transistor 78 the base of transistor 79 is low and the NO light 76 goes off.

Referring to FIG. 3A and particularly the keyboard 22, it will be noted that decimal keys 8 and 9 are provided with connections 8' and 9' indicated to be connected through diodes to the set input line 43 of the flip-flop 26. The purpose of this connection is to set the clear flip-flop in the event that code numbers 8 and 9 are used in the verification number. It will be noted that decimal numbers 8 and 9 are coded identically with numbers 1 and 4 respectively and to avoid the possibility of ambiguity the connections 8' and 9' are included. Alternatively, the connections 8' and 9' could be omitted and the ambiguity involved in the verification number accepted as a slight decrease in the probability of an erroneous verification.

The present invention is capable of a wide field of use other than the simple verification indicator utility heretofore disclosed. For example, the verification output signal can be used to control any associated device such as a cash dispenser, operating a door to a limited access area, or to stamp, emboss or otherwise cancel or indicate that the transaction has been performed on a particular document. For this purpose as shown in FIG. 2 an accessory unit 20 may be connected to be operated by the verification output signal of NAND 17.

As previously mentioned, it is also possible to connect the apparatus of the present invention with a network or other remote terminal facilities to perform additional functions. For example, it may sometimes be desirable to refer an account number to a central storage facility where active account numbers are maintained and where those account numbers which have become invalid or are no longer entitled credit based on past performance or the like are identifiable from storage. In order to utilize the present invention in such applications it is only necessary to connect the encoded output to a suitable system for local or remote processing of the account number relative to an active list of approved and disapproved numbers. For this purpose as shown in FIG. 3A an auxiliary unit 81 is shown connected to receive the bit 1, bit 2 and bit 3 numbers entered by the keyboard 22. The auxiliary unit 81 may include code conversion and transmission equipment as required to present the data relating to an account number on a compatible basis to any other system and such external system encompassed within the auxiliary unit 81 could return the desired information for further utilization at the local transaction level. Thus, for example, if an account number were entered for which credit had recently been denied and the central storage system had been up-dated to recognize this fact, the auxiliary unit 81 could return a signal to actuate a NO indicator 82, for example, which would advise the operator that even though the verification and account number checked through the verification process locally that there was some external reason for indicating that the transaction was not to be verified. Obviously, other information could be called up and displayed in response to the entry of the account number on keyboard 22 by connection through to appropriate auxiliary unit 81 and a suitable utilization of display device 82.

To further improve the security of the disclosed system various forms of safety connections can be employed. For example, in FIG. 3B register U10 has an output 83 which corresponds to an excess digit being entered as a code number and when such excess code digit is entered (i. e., more than three digits) the output on line 83 after suitable inversion in inverter 84 is applied to line 43 to clear the flip-flop 26. When flip-flop 26 is in the CLEAR or SET state a connection on line 85 is applied to inverter 30 of NAND 73 thereby preventing a verifying output from the NAND 73. Thus if numerous random digits instead of a three-digit code verifying number are entered no verification output is possible. Various other superposed safety circuit loops can, of course, be applied as required without departing from the basic invention as herein disclosed and claimed.

The operation of the present invention will now be described. Assuming that a transaction is to be conducted with an account number of 03022 which for the specific device encoded as shown in FIG. 3 will be verified by using a code verification number of 650. The account number 03022, of course, is on the check. Referring to the keyboard 22 of matrix 21 it will be seen that by entering the first 0 of the assumed account number that bit 3 will go to ground and bit 2 will remain high. This corresponds to encoding the decimal digit 0 into the two-bit binary number 10. In similar fashion, depressing the second decimal digit 3 encodes as a 00 on bits 3 and 2 and these bits are entered in the registers U7 and U6 thereby stepping the previous bits corresponding to the first entered decimal digit one stage to the right, i. e., from stage E to D. After the complete five-digit decimal number 03022 has been entered the registers U7 and U6 will have therein the five digit binary numbers representing the bit 2 and bit 3 information and these numbers are indicated in FIG. 3B where register U7 has outputs A, B, C, D, and E containing the binary numbers 10111. Similarly the register U6 has its output terminals A, B, C, D and E containing the binary digits 00011. Thus the account number is encoded and stored in the registers U6 and U7. The operator then presses the code switch 44 which resets the flip-flop 26 permitting the three-digit binary encoding of the next entered number to be entered and stored in the registers U8, U9 and U10. For the verifying number applicable to the assumed account number 03022 the numbers 6,5 and 0 are entered in that sequence. Entering decimal digit 6 by depressing the 6 key of keyboard 22 produces an output of 111 on bit lines 1, 2 and 3 and this three-digit binary number is entered in the registers U8, U9 and U10. After the 6, 5, 0 are entered the registers U8, U9 and U10 store the bits 0 and 1 as indicated. Thus register U8 has at terminals A, B and C the binary digits 101 respectively. Similarly in register U9 terminals A, B and C contain 110 and in register U10 terminals A, B and C contain 110. Upon the entry of the third decimal digit of the verifying number all of the registers U6 through U10 inclusive contain the binary digits indicated in FIG. 3B and through the patchbox connections represented at 71 it will be seen as shown that all of the exclusive OR inputs 72 are matched to produce the required outputs to NAND 73 for a verification output therefrom.

Obviously, many modifications of the present invention can be made in light of the present teaching. In particular, the transformation of input digits whether numerals or letters into an encoded form can assume many different code representations and the present use of binary coding is only to be considered illustrative of one form of conversion. For any such conversions the unequal length account and code numbers which are entered are transformed into encoded forms having at least a portion of the respective encoded representations of matching format in the sense that they are capable of being compared. The selected portion of the matching formats which are compared will, of course, examine the contents of the encoded representation and depending upon the algorithm employed will provide a verification matching through the system for those sets of account numbers and code numbers which fit the algorithm. It should be noted that there is no limit on the length of the account numbers that can be used or the number of customers that can have code numbers and that customers can be added without recoding the system. Although some customers will have the same code number and thus there is the possibility that the code number of one customer would match the account number of another customer the probability that the customer would be able to determine that this was so would be so low that the security of the system is not significantly jeopardized. The invention, accordingly, is not to be considered as limited to the specific disclosed embodiment, but rather is to be interpreted broadly as defined in the appended claims.

I claim:

1. The method of machine verification of the identity of a person as having validating information relative to a multidigit number associated with a document presented by said person as the basis for a transaction comprising:
   entering said multidigit number;
   converting each digit of said multidigit number to a first code representation of the digit valve of each digit in digit sequence of said multidigit number;
   entering validating information derived from said person in the form of a second multidigit number;
   converting each digit of said second multidigit number into a second code representation, the digit sequence of said second code representation having a format matching digit by digit only a portion of said first code representation for a predetermined sequence of m digits of said first number and n digits of said second number where $m>n$ and responding to correspondence as to format and content between said code representations when said second multidigit number is the conditionally unique number preassigned to said person which will effect said correspondence.

2. Verification apparatus comprising
   means for entering first and second multidigit numbers of unequal digit length for comparison as to a predetermined correspondence between said numbers;
   means for converting said first and second numbers by respective distinct transformations into encoded representations of said numbers, said encoded representations providing format correspondence between a portion only of the code representation of the m digits of said first number and the code representation of the n digits of said second number where $m>n$;
   means for comparing said portion and said code representation of said n digits having said format correspondence for a predetermined content correspondence which verifies said predetermined correspondence between said numbers; and
   utilization means responsive upon entry of said first and second multidigit numbers for responding to said predetermined content correspondence.

3. Apparatus according to claim 2 in which said means for converting comprises means for representing said first and second multidigit numbers as binary numbers.

4. Apparatus according to claim 3 in which said means for converting operates to convert each digit of said first and second multidigit numbers into respective binary numbers having unequal binary digit places.

5. Apparatus according to claim 4 and including storage means for storing said respective binary numbers in first and second sets of registers, one register for each said binary digit place.

6. Apparatus according to claim 5 in which said means for comparing comprises means responsive to the binary digit value of a plurality of pairs of binary digits selected in pre-determined order one from each said first and second sets of said registers.

7. Apparatus according to claim 6 in which said means for entering comprises
   keyboard means manually operable to enter said multidigit numbers;
   encoding means responsive to operation of said keyboard means for producing said binary numbers; and
   control means operable on said keyboard for entering the binary number corresponding to said first multidigit number in said first set of registers and for entering the binary number corresponding to said second multidigit number in said second set of registers.

8. Apparatus according to claim 3 and including storage means for storing said binary numbers; and
   means for sequentially entering said first and second multidigit numbers and separately storing the respective said binary numbers corresponding thereto in said storage means.

9. Verification apparatus comprising
   manually operable keyboard means for entering multidigit numbers;
   control means on said keyboard operable for designating respective entry of first and second multidigit numbers;
   encoding means responsive to operation of the keys of said keyboard means and conditioned by said control means for generating two bit or three bit binary numbers for each digit of said multidigit numbers;

a first set of two shift registers for storing said two bit binary number of each digit upon entry of said first multidigit number;

a second set of three shift registers each having less serial storage stages than the registers of said first set for storing said three bit binary number of each digit upon entry of said second multidigit number;

means for combining the outputs from the stages of said shift registers in pairs in predetermined order, one output from said first set paired with one output of said second set;

means for comparing said paired outputs and providing an enabling control output for each matched pair; and means responsive to the outputs of all of said pairs compared for producing a verified output only if all of said pairs produce said enabling control output.

* * * * *

UNITED STATES PATENT OFFICE
CERTIFICATE OF CORRECTION

Patent No. 3,771,128                Dated  November 6, 1973

Inventor(s)    John D. Boardman

It is certified that error appears in the above-identified patent and that said Letters Patent are hereby corrected as shown below:

Column 1, line 5, MAny" should be -- Many --;
         line 35, "Memory on" should be -- memory of --;
         line 37, "unauthroized" should be -- unauthorized --.

Column 2, line 43, "transormation" should be -- transformation --
         line 63, "unauthroized" should be -- unauthorized --.

Column 3, line 13, "merly" should be -- merely --.

Column 8, line 19, "applied to" should be -- applied on --

Column 9, line 49, "valve" should be -- value --.

Signed and sealed this 17th day of September 1974.

(SEAL)
Attest:

McCOY M. GIBSON JR.                C. MARSHALL DANN
Attesting Officer                  Commissioner of Patents